(12) United States Patent
Lopez et al.

(10) Patent No.: US 8,582,195 B2
(45) Date of Patent: Nov. 12, 2013

(54) SYSTEMS AND METHODS FOR RELATIVE POSITIONING

(75) Inventors: James Gerard Lopez, East Schodack, NY (US); Mark Allen Cheverton, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 169 days.

(21) Appl. No.: 13/306,261

(22) Filed: Nov. 29, 2011

(65) Prior Publication Data

US 2013/0135707 A1     May 30, 2013

(51) Int. Cl.
*G02B 26/00* (2006.01)
*B64D 39/00* (2006.01)

(52) U.S. Cl.
USPC ......... 359/291; 359/290; 359/298; 244/135 A

(58) Field of Classification Search
USPC .............. 359/290–295, 298, 446; 355/53, 71; 430/322; 353/13, 122; 356/5.1, 139.08; 342/23, 65; 244/135 A, 180, 194
See application file for complete search history.

(56) References Cited

U.S. PATENT DOCUMENTS

| | | | | |
|---|---|---|---|---|
| 3,917,196 | A * | 11/1975 | Pond et al. ...................... | 342/23 |
| 4,025,193 | A * | 5/1977 | Pond et al. ...................... | 356/5.1 |
| 6,669,145 | B1 * | 12/2003 | Green ........................ | 244/135 A |
| 6,786,455 | B1 * | 9/2004 | Bartov ....................... | 244/135 A |
| 8,194,306 | B2 * | 6/2012 | Turner et al. .................. | 359/305 |
| 2003/0095319 | A1 | 5/2003 | Buzzetta | |
| 2004/0129865 | A1 | 7/2004 | Doane | |
| 2005/0243398 | A1 | 11/2005 | Latypov | |
| 2006/0226293 | A1 | 10/2006 | Mickley et al. | |
| 2007/0023576 | A1 | 2/2007 | Schroeder | |
| 2009/0034043 | A1 | 2/2009 | Kaeriyama | |
| 2009/0106648 | A1 | 4/2009 | Mogilevsky et al. | |
| 2009/0248225 | A1 | 10/2009 | Stecko et al. | |
| 2011/0153211 | A1 | 6/2011 | Stimac et al. | |

FOREIGN PATENT DOCUMENTS

WO    2006091779 A1    8/2006

OTHER PUBLICATIONS

Giampiero Campa et al.; "Simulation Environment for Machine Vision Based Aerial Refueling for UAVs"; Manuscript received Mar. 28, 2006; revised Jan. 7, 2007; released for publication Apr. 2, 2008; 14Pages.

* cited by examiner

*Primary Examiner* — Loha Ben
(74) *Attorney, Agent, or Firm* — Scott J. Asmus

(57) ABSTRACT

Systems and methods for generating a position reference grid and relative positioning of an object are presented. Radiation is emitted towards a digital micro-mirror device including a plurality of micro-mirrors. Additionally, one or more of a plurality of micro-mirrors are modulated such that at least a portion of the radiation reflected from the plurality of micro-mirrors is projected on to a designated location in a designated pattern representative of a position reference grid. The radiation reflected from the plurality of micro-mirrors is detected. Further, the detected radiation is interpreted as location coordinates in the position reference grid. Additionally, the location coordinates are communicated to the object moving in relation to the digital micro-mirror device for positioning the object at a designated position in the position reference grid.

21 Claims, 3 Drawing Sheets

SYSTEMS AND METHODS FOR RELATIVE POSITIONING

BACKGROUND

Embodiments of the present technique relate generally to positioning systems, and more particularly to relative positioning systems and methods for use in guided navigation.

Positioning systems provide location information to allow multi-user and multi-device associations. Particularly, certain positioning systems provide relative position information that allows for enhanced configuration and connection of proximal devices, thus enhancing multiple user and/or device interactions. Wireless Fidelity (WiFi) or Global positioning systems (GPS), for example, typically provide location information for outdoor localization. Certain mobile systems that do not favor inclusion of GPS systems owing to size, costs, and consumptions constraints, however, may employ positioning systems including an external reference infrastructure. These systems measure distances between the object and the reference infrastructure, often computing object positions using a central system.

Some positioning systems, for indoor environments, such as for buildings having weak GPS signal reception, employ Bluetooth, IrDA device discovery, WiFi cell ID, or radio signal strength for fine-grained modeling of spatial relationships. As a further example, aircraft landing systems use optical landing aids, such as visual approach slope indicator (VAST) systems and/or radio-signal positioning systems such as instrument landing systems (ILS) for providing optical glide slope information for aircrafts approaching a fixed runway. These systems, however, may not be suitably adapted for positioning two moving objects relative to each other.

In particular, certain mobile systems allowing "peer-to-peer" interactions favor relative positioning systems that entail minimal infrastructure and can operate even in unfamiliar environments. Aerial refueling, for example, requires precise positioning of a receiver aircraft with respect to a tanker aircraft for safe engagement of corresponding probe and drogue for dispensing fuel. Although it is desirable for the drogue and probe to remain stationary for refueling, the probe-drogue combination has a relatively large dynamic response to disturbances caused by wind gusts, turbulence, and/or a bow wave created by the receiver aircraft. The requirement of precise relative spatial positioning of two rapidly moving aircrafts, thus, makes in-flight refueling a challenging operation.

Accordingly, certain aerial refueling systems employ optical systems for positioning refueling drogues with respect to refueling probes attached to the receiver aircraft. The relative unmaneuverability of the refueling drogue and the size, cost and complexity of positioning equipment, however, renders these systems inadequate for operations requiring precise positioning. Accordingly, positioning systems that allow precise positioning of moving objects relative to each other in different operating conditions are desirable.

BRIEF DESCRIPTION

One aspect of the present system corresponds to a positioning system including a digital micro-mirror device comprising a plurality of micro-mirrors and a radiation source configured to emit radiation towards the digital micro-mirror device. The positioning system further includes a modulator operatively coupled to the digital micro-mirror device. The modulator is configured to modulate one or more of the plurality of micro-mirrors such that at least a portion of the radiation reflected from the plurality of micro-mirrors is projected on to a designated location in a designated pattern representative of a position reference grid.

Another aspect of the present disclosure is drawn to a relative navigation system including a digital micro-mirror device comprising a plurality of micro-mirrors and a radiation source configured to emit radiation towards the digital micro-mirror device. The relative navigation system further includes a modulator operatively coupled to the digital micro-mirror device. The modulator is configured to modulate one or more of the plurality of micro-mirrors such that at least a portion of the radiation reflected from the plurality of micro-mirrors is projected on to a designated location in a designated pattern representative of a position reference grid. Additionally, the system includes a detector configured to detect the radiation reflected from the plurality of micro-mirrors and interpret the detected radiation as location coordinates in the position reference grid. The system also includes a communication link configured to communicate the location coordinates to an object moving in relation to the position reference grid.

Certain aspects of the present technique correspond to a method for generating a position reference grid. Radiation is emitted towards a digital micro-mirror device including a plurality of micro-mirrors. Additionally, one or more of a plurality of micro-mirrors are modulated such that at least a portion of the radiation reflected from the plurality of micro-mirrors is projected on to a designated location in a designated pattern representative of a position reference grid. Further, the radiation reflected from the plurality of micro-mirrors is detected. The detected radiation is then interpreted as location coordinates in the position reference grid.

A further aspect of the present technique corresponds to a method for relative positioning of an object. Radiation is emitted towards a digital micro-mirror device including a plurality of micro-mirrors. Additionally, one or more of a plurality of micro-mirrors are modulated such that at least a portion of the radiation reflected from the plurality of micro-mirrors is projected on to a designated location in a designated pattern representative of a position reference grid. The radiation reflected from the plurality of micro-mirrors is detected. Further, the detected radiation is interpreted as location coordinates in the position reference grid. Additionally, the location coordinates are communicated to the object moving in relation to the digital micro-mirror device for positioning the object at a designated position in the position reference grid.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description presents exemplary systems and methods for relative positioning of objects. Particularly, embodiments illustrated hereinafter disclose positioning systems and methods that employ a position reference grid generated using a digital micro-mirror device (DMD) to provide precise positioning of two or more moving objects relative to each other.

Although exemplary embodiments of the present technique are described in the context of a mid-air or in-flight aircraft refueling operation, it will be appreciated that use of the present technique in various other positioning applications and systems is also contemplated. Some of these systems include a relative navigation system, an autonomous vehicle navigation system, a space docking system and/or a guided navigation system. An exemplary environment that is suitable for practicing various implementations of the present technique is discussed in the following sections with reference to FIG. 1.

Figure 1:
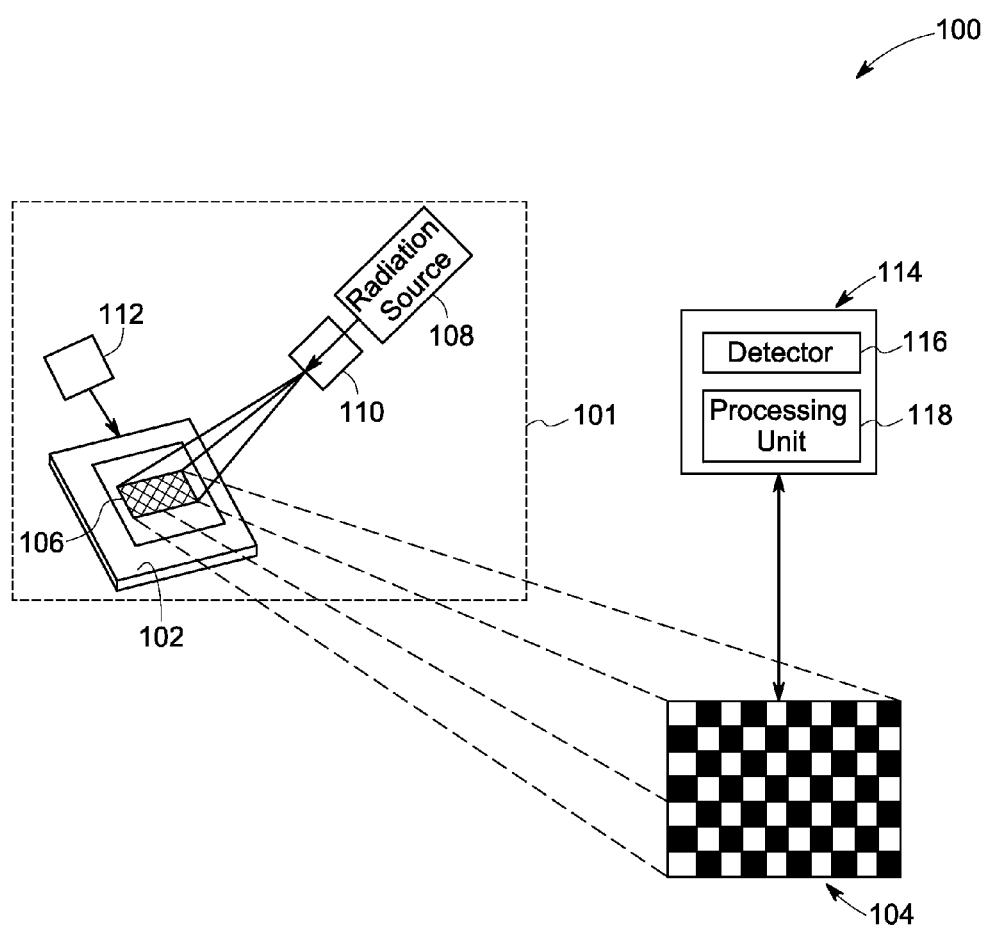
FIG. 1 is a pictorial view of an exemplary positioning system for allowing relative positioning of objects, in accordance with aspects of the present system.

FIG. 1 illustrates an exemplary positioning system 100 for use in relative positioning of an object. For discussion purposes, the system 100 is described with reference to an aerial refueling operation. Accordingly, in one embodiment, the system 100 includes a DMD unit 101, which in turn, includes a DMD 102 for generating a position reference grid 104. Particularly, the DMD 102 includes a plurality of micro-mirrors 106 arranged in a rectangular array corresponding to pixels in an image to be displayed. The micro-mirrors 106 can be individually rotated to an on or off state. In one embodiment, the micro-mirrors 106 are positioned to reflect incident radiation making the pixel appear bright in the on state, while blocking the radiation in the off state, thus making the corresponding pixel appear dark. The micro-mirrors 106, thus, are used to modulate and project a designated pattern representative of the position reference grid 104. To that end, the DMD unit 101 includes a radiation source 108 that emits radiation towards one or more of the micro-mirrors 106 of the DMD 102 for projecting the position reference grid 104.

In one embodiment, for example, the radiation source 108 includes a laser source that emits a laser beam of wavelength of about 400 nanometers to about 10000 nanometers towards the micro-mirrors 106 for generating the designated patterns representative of the position reference grid 104. The designated pattern, in one implementation, corresponds to a two-dimensional (2D) or three-dimensional (3D) coordinate grid. Although FIG. 1 depicts the pixels of the position reference grid 104 as squares, in one example, the pixels include other shapes such as rectangle, circle, or polyconic shapes.

Further, in certain embodiments, the position reference grid 104 is projected on to a designated location such as in 3D space. In an alternative embodiment, however, the radiation source 108 emits radiation corresponding to blue-green wavelength to project the position reference grid 104 onto a designated location in a liquid medium such as water. The system 100, thus, employs an appropriate radiation source and/or adapts the wavelength of the radiation to project the position reference grid 104 on to specific media such as air, water or any suitable surface.

To that end, in an exemplary aerial refueling embodiment, the system 100 expands the laser beam into a divergent beam using an optical element 110, such as a convergent lens, divergent lens, convergent mirror, divergent mirror, or a diffractive optical element, operatively coupled to the radiation source 108. The laser beam expanded using the optical element 110 impinges on at least a portion of the DMD 102. The reflective property of the micro-mirrors 106 causes the laser beam to reflect off the DMD 102 and be projected, for example, into free space while continuing to diverge forming a certain pattern.

In certain embodiments, the system 100 uses a modulator 112 that modulates the micro-mirrors 106 based on a specified encoding scheme to project the designated encoded pattern represented by the position reference grid 104. To that end, the specified encoding scheme, for example, may be programmed into the modulator 112, or may be supplied by a user and/or an associated processing system (not shown). In one embodiment, the modulator 112 uses a digital encoder, electrostatic means and/or electronic means to generate a series of ones and zeroes that encode a value of a unique row and column location in the position reference grid 104 based on the designated scheme. Specifically, the modulator 112 modulates one or more of the micro-mirrors 106 to selectively reflect or block the impinging laser beam such that the resulting projection of the DMD 102 into free space corresponds to the designated encoded pattern.

In one embodiment, the modulator 112 modulates the micro-mirrors 106 to generate the projection representative of a 2D grid coordinate system such that each micro-mirror corresponds to a particular coordinate in the grid. To that end, the modulator 112 modulates the micro-mirrors 106, for example, arranged in 768 rows and 1024 columns in the DMD 102 to represent a total of 768×1024=786, 432 coordinate positions in the position reference grid 104. In the present example, the modulator 112 modulates the first micro-mirror in the first row and first column to represent the coordinate (1,1) in the 2D grid 104. Similarly, the modulator 112 modulates the last micro-mirror in the last row and last column to represent the coordinate (768, 1024) in the 2D grid 104.

Furthermore, in certain embodiments, the system 100 configures one or more system parameters such as the angle of divergence of the reflected radiation to project the position reference grid 104 at desired dimensions. Additionally, the system 100 may also configure a distance between the DMD 102 and the designated location, and/or the size of the micro-mirrors 106 to control one or more dimensions of the position reference grid 104. The one or more dimensions, for example, include size, thickness, height and/or width of the columns and rows of the position reference grid. Particularly, in one embodiment, the system 100 configures one or more of the system parameters such that projected columns and rows of the position reference grid 104 are about 1 inch wide at about 100 feet from the DMD 102.

The system 100, thus, conveys a location coordinate represented by each micro-mirror by modulating the micro-mirrors 106 to encode a bit pattern of reflected radiation that can be detected and interpreted by a detection unit 114 as a row-column coordinate pair in the 2D grid. To that end, the detection unit 114 includes a detector 116, for example, a laser light/photodetector operatively coupled to the object to be positioned in relation to the DMD 102 to detect the bit pattern in the projected grid 104. The detector 116 uses the projection of the 2D grid pattern as a position reference system to determine the detector's own position in space such as in relation to the position of the DMD 102.

Further, in certain embodiments, the detector 116 detects the grid 104 projected by the DMD 102 in free space and communicates the detected projections of one or more pixels of the grid 104 to a processing unit 118 communicatively coupled to the detector 116. The processing unit 118, for example, processes the received projections to identify the bit pattern encoded by the micro-mirrors 106. In one example, the processing unit 118 interprets the encoded bit pattern from digitized projection data to determine the detector's location coordinates in free space in relation to the DMD 102. Accordingly, the processing unit 118 includes, for example, digital signal processors, microcomputers, microcontrollers, Application Specific Integrated Circuits (ASICs), Field Programmable Gate Arrays (FPGA), or one or more general-purpose or application-specific processors in communication with the system 100.

Further, the processing unit 118 allows positioning of one or more objects such as a refueling drogue or boom of a tanker aircraft and/or the receiving aircraft in relation to each other by using the location coordinates determined by the detector unit 114. Accordingly, in one embodiment, the detector 116 is disposed on or is operatively coupled to one or more of the objects to be positioned in relation to the DMD 102. Specifically, the system 100 uses the detector's location coordinates as being representative of the objects' location in free space.

In certain embodiments, the system 100 configures one or more components of the system 100, such as the DMD unit 101 and the detection unit 114 for use in a variety of applications, for example, relative positioning, guided navigation and aerial refueling. In relative positioning applications such as aircraft landing systems and space or ship docking systems, the DMD unit 101 may be disposed proximal the landing strips or the docking stations for projecting the position reference grid 104. Further, the detection unit 114 is operatively coupled to an aircraft, a ship or a spacecraft to detect corresponding position using the grid 104. The aircraft, ship or spacecraft then uses the detected position to precisely land or dock onto a designated location on the landing strips or the docking stations.

Furthermore, certain embodiments of the present system 100 include kits or packs including devices to allow certain objects such as aircrafts, boats, unmanned underwater vehicles (UUVs), unmanned aerial vehicles (UAVs), missiles and other vehicles to be retrofitted for position determination. Accordingly, in one embodiment, the kit includes devices such as the DMD unit 101, the detection unit 114, a transmitter (not shown) and/or active control systems (not shown) that allow position determination and/or active control. In certain embodiments, multiple kits may be employed. By way of example, the system 100 may be implemented using a first kit including the DMD unit 101 to be retrofitted to the reference object such as the tanker aircraft. Further, a second kit including the detection unit 114 may be retrofitted to the object to be positioned such as the receiver aircraft.

Figure 2:
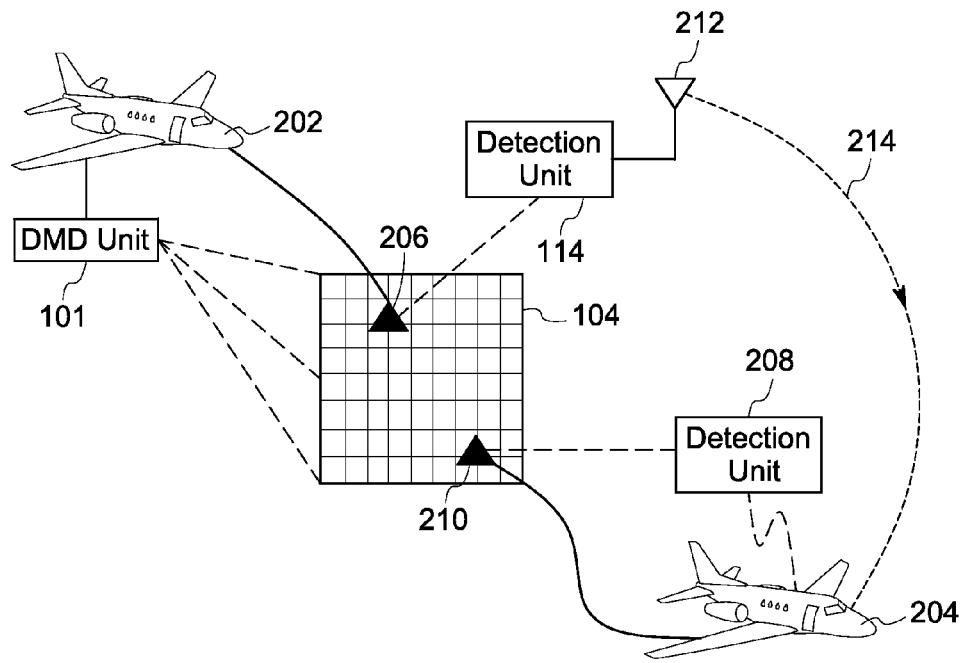
FIG. 2 is an illustration of an exemplary configuration of the positioning system components for use in an aerial refueling operation, in accordance with aspects of present system.
Figure 3:
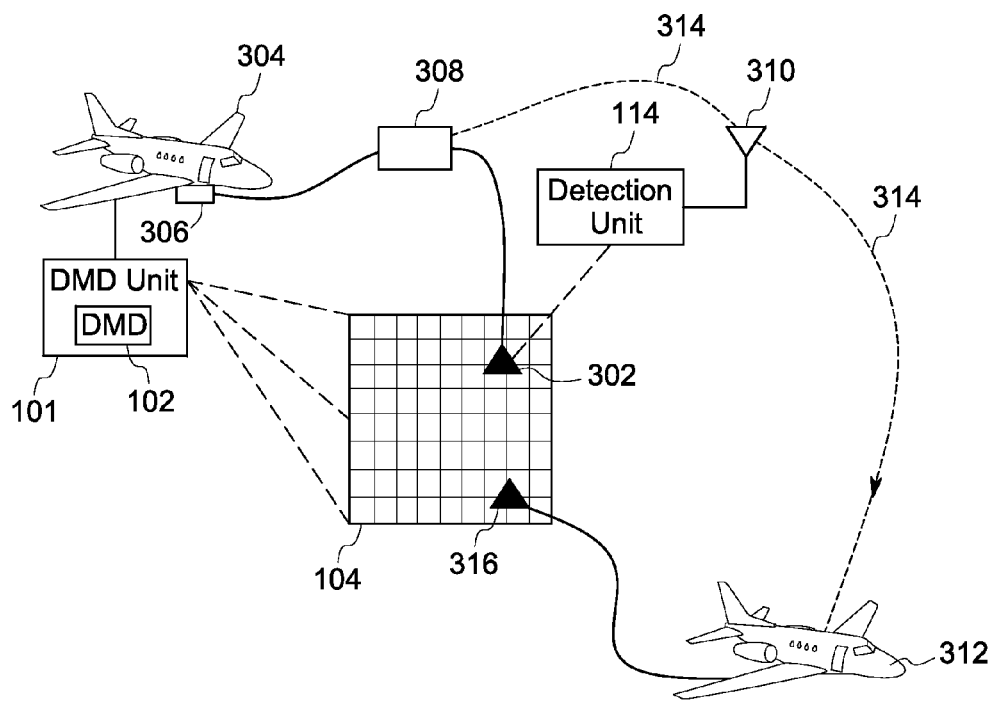
FIG. 3 is an illustration of an exemplary configuration of the positioning system components for controlling and/or maintaining the position of a refueling drogue, in accordance with aspects of present system.

The system 100, thus, can be configured in a plurality of ways for use in different relative positioning applications. FIGS. 2-3, for example, depict exemplary configurations of one or more components of the system 100 for use in aerial refueling applications. Particularly, FIG. 2 illustrates an exemplary configuration of the positioning system components for use in an aerial refueling operation. As previously noted, aerial refueling is often a challenging operation owing to a relatively large dynamic response of the probe-drogue combination to disturbances caused by wind gusts, turbulence, and/or bow waves created by the receiver aircraft. Accordingly, the system 100 allows for precise positioning of a tanker aircraft 202 with respect to a receiver aircraft 204 for refueling operations by using the position reference grid 104 generated using the DMD 102.

To that end, in one embodiment, the DMD unit 101 of the tanker aircraft 202 projects the position reference grid 104 proximal the space where a corresponding refueling drogue 206 is deployed. Further, the receiver aircraft 204 is equipped with a detection unit 208 for detecting the position of the receiver aircraft 204 within the reference grid 104. Additionally, in certain embodiments, the drogue 206 includes the detection unit 114 that estimates the position of the drogue 206 in free space for safe engagement to a probe 210 associated with the receiver aircraft 204 for dispensing fuel.

In more particular detail of this embodiment, the DMD unit 101 of the tanker aircraft 202 configures the micro-mirrors to project the grid 104 with each pixel modulated, for example, with row/column coordinates. The detection unit 208 of the receiver aircraft 204 continuously tracks the position of the receiver aircraft 204 via the grid 104. Similarly, the detection unit 114 operatively coupled to the drogue 206 detects the pixels of the projected grid 104 to allow precise determination of the position of the drogue 206 in the grid 104. Furthermore, in one example, the probe 210 is equipped with detectors that are communicatively coupled to the detection unit 208 such that the position of the probe 210 in the grid 104 is also known.

In one embodiment, the drogue 206 includes a transmitter 212 that communicates the determined position of the drogue 206 to the receiver aircraft 204 via a communications link 214. In another embodiment, the receiver aircraft 204 and/or the probe 210 include transmission means (not shown) that allow communication of positions of the probe 210 and/or the receiver aircraft 204 to the drogue 206 and/or the tanker aircraft 202. Sharing the location coordinates determined by corresponding detection units allows precise positioning of the tanker aircraft 202 in relation to the receiver aircraft 204 for dispensing fuel.

Further, FIG. 3 illustrates an exemplary configuration of the positioning system components for controlling and/or maintaining the position of a refueling drogue 302 relative to the DMD 102 for refueling operations. To that end, the DMD unit 101 is disposed on a tanker aircraft 304 to project the position reference grid 104 in a space proximate a fuel tanker 306 of the tanker aircraft 304 from which the refueling drogue 302 is deployed. Further, the drogue 302 is equipped with the detection unit 114 for determining corresponding coordinates relative to the DMD 102 associated with the tanker aircraft 304.

In one embodiment, the drogue 302 includes an active control unit 308 in communication with the detection unit 114 for controlling the position of the drogue 302 in free space. To that end, the detection unit 114 includes a transmitter 310 that transmits a control signal to the active control unit 308 for changing and/or maintaining the position of the drogue 302 at a designated location in the position reference grid 104. The positioning system 100 along with the active control unit 308, thus allows the drogue 302 to maintain a designated position in space with respect to the DMD 102.

Further, the tanker aircraft 304, the drogue 302 or the detection unit 114 may communicate the designated or determined position of the drogue 302 to an approaching receiver aircraft 312 via a communications link 314, thus allowing a safe connection between a probe 316 of the receiver aircraft 312 and the drogue 302. In certain embodiments, the receiver aircraft 312 may also include a display (not shown) that visually indicates the location coordinates detected by the detection unit 114 and/or received via the communications link 314 for enhanced aircraft maneuverability. To that end, in one embodiment, a pilot of the receiver aircraft 312 manually adjusts the position of the receiver aircraft 312 for dispensing fuel. In an alternative embodiment, however, the location coordinates of the drogue 302 are relayed to a control system (not shown) of the receiver aircraft 312 that automatically maneuvers the receiver aircraft 312 proximal to the designated position of the drogue 302 to allow safe mid-air refueling operations.

Embodiments of the positioning system 100, thus allow precise relative spatial positioning of two rapidly moving objects via a position reference grid generated using the DMD 102. Particularly, use of the DMD 102 in the system 100 allows fabrication of compact, lightweight and low power positioning systems for use in a variety of relative positioning applications. Furthermore, the absence of moving components greatly enhances the accuracy and durability of the system 100, thus providing extremely reliable positioning systems even for automated and/or unmanned mobile systems. Certain exemplary methods for relative positioning of a moving object via a position reference grid generated using a DMD will be described in greater detail with reference to FIGS. 4-5.

Figure 4:
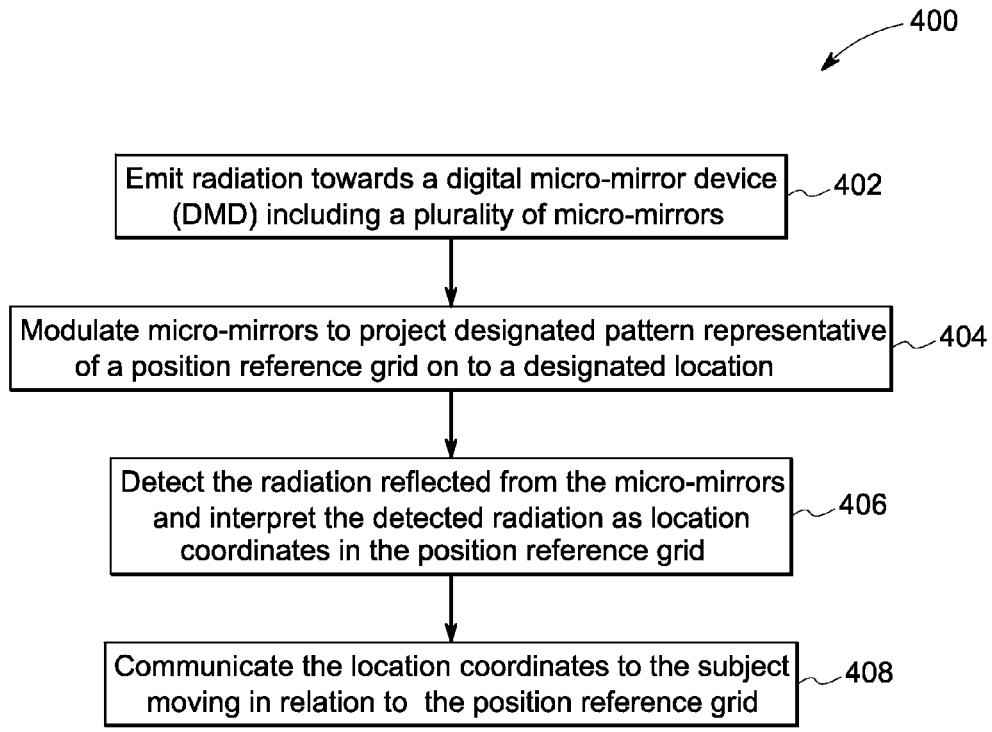
FIG. 4 is a flowchart depicting an exemplary method for relative positioning of objects, in accordance with aspects of present technique.

FIG. 4 illustrates a flow chart 400 depicting an exemplary method for relative positioning and/or navigation of two or more moving objects using a position reference grid. The exemplary method may be described in a general context of computer executable instructions stored and/or executed on a computing system or at least one processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a wired and/or wireless communication network, including cloud computing. In the distributed computing environment, the computer executable instructions may be located in both local and remote computer storage media, including memory storage devices.

Further, in FIG. 4, the exemplary method is illustrated as a collection of blocks in a logical flow chart, which represents operations that may be implemented in hardware, software, or combinations thereof. The various operations are depicted in the blocks to illustrate the functions that are performed, for example, during generating the position reference grid, determining location coordinates and relative positioning phases of the exemplary method. In the context of software, the blocks represent computer instructions that, when executed by one or more processing subsystems, perform the recited operations.

The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the object matter described herein. For discussion purposes, the exemplary method will be described with reference to the elements of FIGS. 1-3.

Relative positioning systems, such as GPS, WiFi, and optical positioning aids provide location information for enhanced multi-user and/or device interactions. Some of these positioning systems, however, may find limited use in precisely positioning two moving objects relative to each other in different operating conditions. Furthermore, size, costs, and complexity concerns often limit use of such systems to a small number of applications. Accordingly, embodiments of the present method describe an exemplary technique for relative positioning of moving objects via a position reference grid generated using a DMD.

For discussion purposes, embodiments of the present method will be described with reference to an aircraft refueling operation using the positioning system 100 of FIG. 1. However, it may be noted, that embodiments of the present method can also be used in various other positioning applications and systems such as an autonomous and/or unmanned vehicle navigation system, a space docking system and/or a guided navigation system.

Accordingly, at 402, the radiation source 108 emits radiation towards the DMD 102. In certain embodiments, system may use the optical element 110 to expand the emitted radiation, such as a laser beam into a square or rectangular beam. The expanded laser beam impinges on the DMD 102 and is reflected off one or more of the micro-mirrors 106, in turn projecting the position reference grid 104 into free space. In one embodiment, the radiation source 108 emits 1.55-micron laser light that reflects off the DMD 102 and provides a projection of the position reference grid 104 that can be detected even in inclement or cloudy weather. In an alternative embodiment, however, the radiation source 108 emits, for example, a blue-green laser of wavelength of about 405 nanometers to about 555 nanometers to project the position reference grid 104 onto a water surface. The system 100, thus, adapts the wavelength of the emitted radiation to project the position reference grid 104 for use in specific media and/or operating conditions.

Further, at 404, one or more of the micro-mirrors 106 are modulated such that at least a portion of the radiation reflected from the micro-mirrors 106 is projected on to a designated location in a designated pattern representative of the position reference grid 104. Particularly, in one embodiment, the micro-mirrors 106 are modulated based on a specified encoding scheme, for example, programmed into the modulator 112, or supplied by a user and/or an associated processing system. The modulator 112, for example, uses electrostatic and/or electronic means to generate a series of ones and zeroes that encode a location in the position reference grid 104 based on a specified encoding scheme. Specifically, the modulator 112 modulates one or more of the micro-mirrors 106 to selectively reflect or block the impinging laser beam such that the resulting projection of the DMD 102 into free space corresponds to the designated pattern.

Figure 5:
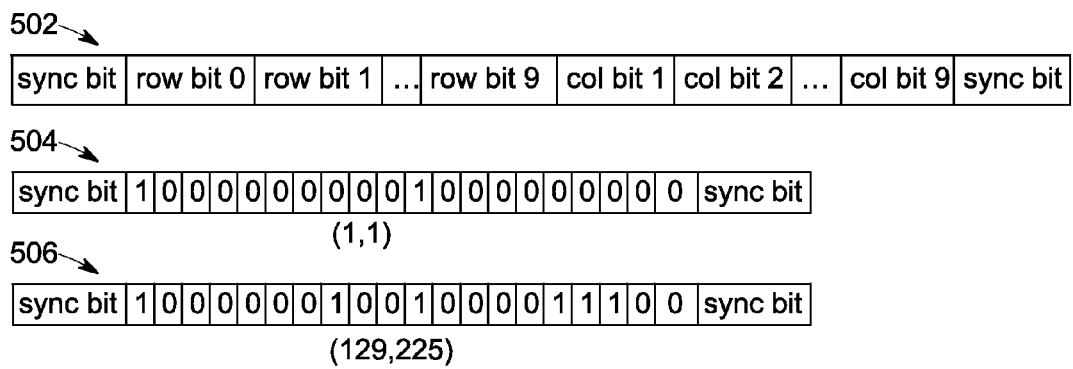
FIG. 5 is a representation of exemplary patterns representative of grid coordinates generated using the method of FIG. 4, in accordance with aspects of the present technique.

Accordingly, in one embodiment, the modulator 112 modulates the micro-mirrors 106 to project a 2D grid coordinate system such that each micro-mirror corresponds to a particular coordinate in the grid. To that end, the modulator 112 modulates, for example, an array of 1064 by 860 micro-mirrors in the DMD 102 to represent 915,040 coordinate positions by selectively blocking or reflecting the incident radiation to project a checkerboard projection in free space. FIG. 5 illustrates exemplary patterns encoded by the modulator 112 to generate the checkerboard projection.

In FIG. 5, element 502 corresponds to an exemplary bit pattern for use by the system 100 to convey a coordinate in the 2D position reference grid 104. Particularly, in the bit pattern 502, a bit "1" represents a mode where the micro-mirror is modulated to reflect incident radiation, whereas the bit "0" represents a mode where the micro-mirror in modulated to block incident radiation. Accordingly, a bit pattern 504 represents the coordinate (1,1) and a bit pattern 506 represents the coordinate (129,225) in the 2D position reference grid 104. The system 100 may similarly employ other modulation schemes for projecting different designated patterns for use as the position reference grid 104.

Furthermore, in certain embodiments, the system 100 also configures the angle of divergence of the reflected radiation, the size of the micro-mirrors 106 and/or a distance between the DMD 102 and the designated location to adjust the dimensions of the position reference grid 104. To that end, the grid dimensions, for example, include size, thickness, height and/or width of the columns and rows of the position reference grid. Particularly, in one embodiment, the system 100 configures the system parameters such that the projected columns and rows are of about 1 inch thickness at about 100 feet from the DMD 102 to enhance detection.

Accordingly, at 406 in FIG. 4, the detection unit 114 detects the radiation reflected from the micro-mirrors 106 and interprets the bit pattern encoded in the detected radiation as location coordinates in the position reference grid 104. Particularly, in one embodiment, the detection unit 114 digitizes the detected radiation data and interprets the encoded bit pattern to determine the detector's location coordinates in relation to the DMD 102 in free space. In the presently contemplated embodiment, the detector 116 is disposed on or is operatively coupled to the object to be positioned in relation to the DMD 102. Accordingly, the system 100 uses the detector's location coordinates as being representative of the object's location in free space.

Accordingly, at 408, the system 100 communicates the detected location coordinates for positioning the object at a designated position in the position reference grid 104. To that end, in one embodiment, the DMD unit 101 is coupled to a tanker aircraft to allow a proximal projection of the position reference grid 104. Further, the detection unit 114 is operatively coupled to the refueling drogue or boom of the tanker aircraft to allow accurate detection of the location coordinates of the drogue in the position reference grid 104 projected by the DMD unit 101 coupled to the tanker aircraft. The system 100 may then communicate the detected location coordinates as coordinates in free space to a receiver aircraft to allow precise positioning of the receiver aircraft in relation to the drogue for the refueling operation.

Embodiments of the present methods and systems, thus, disclose an efficient technique for relative positioning of two or more moving objects. Particularly, embodiments of the present methods and systems described herein allow precise relative spatial positioning of moving objects even in absence of any external infrastructure or complicated hardware. Further, use of the DMD in place of multiple components allows fabrication of compact, lightweight and low power positioning systems for use in a variety of relative positioning applications. In addition, the absence of moving components greatly enhances the accuracy and durability of the system, thus providing extremely reliable positioning systems even for automated and/or unmanned mobile systems.

Although specific features of various embodiments of the invention may be shown in and/or described with respect to some drawings and not in others, this is for convenience only. It is to be understood that the described features, structures, and/or characteristics may be combined and/or used interchangeably in any suitable manner in the various embodiments, for example, to construct additional assemblies and techniques. Additionally, while only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A positioning system, comprising:
   a digital micro-mirror device comprising a plurality of micro-mirrors;
   a radiation source configured to emit radiation towards the digital micro-mirror device; and
   a modulator operatively coupled to the digital micro-mirror device, wherein the modulator is configured to modulate one or more of the plurality of micro-mirrors such that at least a portion of the radiation reflected from the plurality of micro-mirrors is projected on to a designated location in a designated pattern representative of a position reference grid.

2. The system of claim 1, further comprising a detector configured to detect the radiation reflected from the plurality of micro-mirrors and interpret the detected radiation as location coordinates in the position reference grid.

3. The system of claim 2, further comprising a communication link configured to communicate the location coordinates to an object moving in relation to the digital micro-mirror device.

4. The system of claim 1, wherein the modulator is configured to modulate one or more of the micro-mirrors to either reflect or block at least a portion of the radiation impinging on corresponding micro-mirror to form the designated pattern.

5. The system of claim 1, wherein the position reference grid corresponds to a multi-dimensional coordinate system.

6. The system of claim 1, wherein the position reference grid corresponds to a two-dimensional coordinate system.

7. The system of claim 1, further comprising an optical element operatively coupled to the radiation source, wherein the optical element is configured to adapt the emitted radiation into a rectangular shape.

8. The system of claim 1, wherein the radiation source is configured to emit radiation of a particular wavelength for projecting the position reference grid in a particular medium.

9. The system of claim 8, wherein the particular medium is free space.

10. The system of claim 9, wherein the radiation source is configured to emit the radiation of wavelength between 400 nanometers to 10000 nanometers for projecting the position reference grid in free space.

11. The system of claim 8, wherein the particular medium is water.

12. The system of claim 11, wherein the radiation source is configured to emit the radiation of blue-green wavelength for projecting the position reference grid under water.

13. The system of claim 1, wherein one or more dimensions of the position reference grid are based on the size of the plurality of micro-mirrors, an angle of divergence of the emitted radiation, a distance between the digital micro-mirror device and the designated location, or combinations thereof.

14. The system of claim 1, wherein the system is a relative navigation system.

15. The system of claim 1, wherein the system is an aerial re-fueling system.

16. The system of claim 1, wherein the system is an autonomous vehicle navigation system.

17. The system of claim 1, wherein the system is a space docking system.

18. A method for generating a position reference grid, comprising:
   emitting radiation towards a digital micro-mirror device comprising a plurality of micro-mirrors;
   modulating one or more of a plurality of micro-mirrors such that at least a portion of the radiation reflected from the plurality of micro-mirrors is projected on to a designated location in a designated pattern representative of a position reference grid; and
   detecting the radiation reflected from the plurality of micro-mirrors and interpreting the detected radiation as location coordinates in the position reference grid.

19. A method for relative positioning of an object, comprising:
- emitting radiation towards a digital micro-mirror device comprising a plurality of micro-mirrors;
- modulating one or more of a plurality of micro-mirrors such that at least a portion of the radiation reflected from the plurality of micro-mirrors is projected on to a designated location in a designated pattern representative of a position reference grid;
- detecting the radiation reflected from the plurality of micro-mirrors and interpreting the detected radiation as location coordinates in the position reference grid; and
- communicating the location coordinates to the object moving in relation to the digital micro-mirror device for positioning the object at a designated position in the position reference grid.

20. A relative navigation system, comprising:
- a digital micro-mirror device comprising a plurality of micro-mirrors;
- a radiation source configured to emit radiation towards the digital micro-mirror device;
- a modulator configured to modulate one or more of the plurality of micro-mirrors such that at least a portion of the radiation reflected from the plurality of micro-mirrors is projected on to a designated location in a designated pattern representative of a position reference grid;
- a detector configured to detect the radiation reflected from the plurality of micro-mirrors and interpret the detected radiation as location coordinates in the position reference grid; and
- a communication link configured to communicate the location coordinates to an object moving in relation to the position reference grid.

21. The system of claim 20, wherein the relative navigation system comprises an aerial refueling system, a drogue operatively coupled to a mobile system, an autonomous vehicle navigation system, a space docking systems, a guided-navigation system, or combinations thereof.

* * * * *